United States Patent [19]

Johannsen et al.

[11] 4,142,567
[45] Mar. 6, 1979

[54] PNEUMATIC VEHICLE TIRE

[75] Inventors: Peter Johannsen, Hannover-Herrenhausen; Julius Peter, Hanover; Gerhard Mauk, Wunstorf, all of Fed. Rep. of Germany

[73] Assignee: Continental Gummi-Werke Aktiengesellschaft, Hanover, Fed. Rep. of Germany

[21] Appl. No.: 897,137

[22] Filed: Apr. 17, 1978

Related U.S. Application Data

[63] Continuation of Ser. No. 709,301, Jul. 28, 1976, abandoned.

[30] Foreign Application Priority Data

Aug. 6, 1975 [DE] Fed. Rep. of Germany ....... 2535008

[51] Int. Cl.$^2$ .............................................. B60C 17/00
[52] U.S. Cl. ............................ 152/353 R; 152/354 R; 152/362 R
[58] Field of Search ............... 152/158, 209 R, 352 R, 152/352 A, 353 R, 353 C, 354, 361 R, 362 R, 362 CS, 357 A

[56] References Cited

U.S. PATENT DOCUMENTS

| 3,118,482 | 1/1964 | Beissner | 152/362 R |
| 3,685,564 | 8/1972 | Smithkey, Jr. | 152/356 |

FOREIGN PATENT DOCUMENTS

| 1505141 | 4/1969 | Fed. Rep. of Germany | 152/362 R |
| 1416856 | 9/1965 | France | 152/352 R |
| 1359416 | 7/1974 | United Kingdom | 152/353 R |

*Primary Examiner*—Francis S. Husar
*Assistant Examiner*—Donald W. Underwood
*Attorney, Agent, or Firm*—Walter Becker

[57] ABSTRACT

Pneumatic vehicle tires having a carcass with a tread strip centrally arranged thereon. The carcass freely spans the wheel rim and is only slightly outwardly curved when in a non-depressed condition. At its rim area the carcass is deflected by means of its arc of curvature towards the tire beads which are reinforced with pull-resistant cores. The carcass has a thickness which continuously decreases from its maximum thickness in the region of the tire bead to a fraction thereof at the edges of the tread strip. The carcass is provided with two fabric plies which are looped around the cores. Decreasing in distance between each other, the two plies extend beneath the tread strips. In the arc of curvature the two plies surround an elastic, deformable, incompressible intermediate layer which has an approximately wedge-shaped cross section.

3 Claims, 1 Drawing Figure

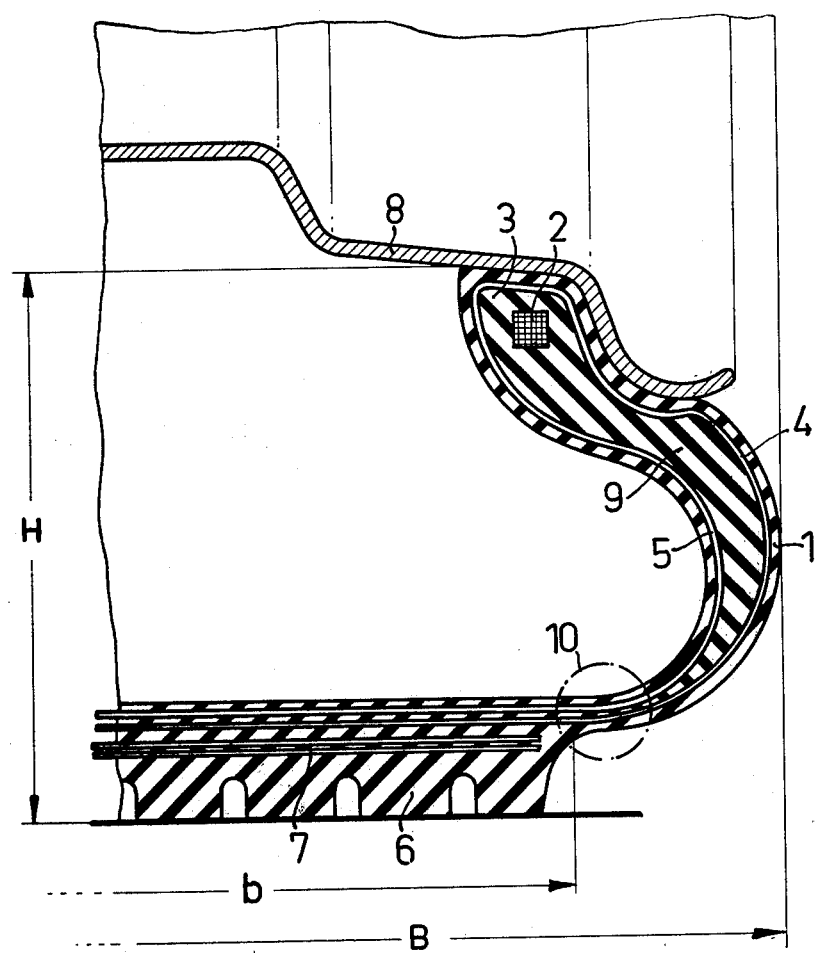

PNEUMATIC VEHICLE TIRE

This is a continuation of application Ser. No. 709,301, filed July 28, 1976 now abandoned.

The present invention relates to pneumatic tires for vehicles. The tires have a carcass with a tread strip centrally arranged thereon. The carcass freely spans the wheel rim and in a non-depressed condition is only slightly outwardly curved. At its rim areas the carcass is by means of its arc of curvature deflected toward the tire beads which are reinforced with pull-resistant cores.

In comparison to conventional pneumatic tires which have approximately circular or similar bulging cross sections, the so-called flat tires, which have an approximately lenslike cross section, exhibit a surprisingly favorable behavior with regard to riding comfort and form stability, despite their substantially small volume and high air pressure. A controlling factor for the soft depression of these tires and for the course of the overall effective operation during the rolling movement of the tires is primarily the shifting of the intrinsic work of elastic strain cushioning action into the transition zones from the arc of curvature of the carcass towards the rim edges of the mounted tread strip.

It is an object of the present invention, by means of a novel fashioning of the carcass, to structurally emphasize those portions which dynamically take part in the deflections and to separate these portions relative to the predominantly statically stressed side walls.

It is a further object of the present invention at the same time also to improve the up to now still frequently unsatisfactory emergency running features of flat tires.

These and other objects and advantages of the invention will appear more clearly from the following specification in connection with the accompanying drawing which shows a cross section of a portion of a flat tire and pertaining wheel rim according to the invention.

The pneumatic vehicle tire according to the present invention is characterized primarily in that the carcass has a thickness which continuously decreases from its maximum thickness in the region of the tire bead to a fraction thereof in the rim area of the tread strip. The subject tire is further characterized in that the carcass has two fabric plies. These plies are looped around the cores in the tire beads. With a continuously decreasing distance between each other, the two plies extend inwardly of the tread strips. In the arc of curvature, the two plies surround an elastic, deformable, incompressible intermediate layer having an approximately wedge-shaped cross section. This incompressible intermediate layer expediently consists of a rubber mixture having a Shore hardness of from 60° to 80° in which connection it may be advantageous to use a fiber filled mixture. To take full advantage of the possibilities associated therewith requires a tire cross section in which the height does not exceed one third the width and for which the tread strip, which is mounted on the carcass with sharply defined rims or edges, has a width measuring up to about ⅔ the total width of the tire as measured at the outer edge of the carcass.

The present invention produces a flat tire with distinct division into a predominantly static and another predominantly dynamic operating or functional area. While the chiefly curved side walls of the carcass form comparatively stiff or rigid form-retaining elements, as a result of the novel side wall construction, due to the incorporation of the incompressible intermediate layer, which fills up the free space between the fabric plies, these side walls are connected to the tread strip which likewise is rigid by means of the oscillatable narrow end and transition zones which exclusively perform the elastic or spring and cushioning action. As opposed to normal yielding or floating transitions, the localization of the deflection areas according to the invention which localization is limited and separated both structurally as well as functionally towards both sides results in an excellent deflection behavior of the novel tire with great inherent form stability. A further important advantage of the present invention is the ability of the tire to roll when not inflated. Until now the two criteria, soft deflection with great riding comfort on the one hand, and good emergency running features on the other hand, were mutually exclusive with the heretofore known structural means and steps. With the present invention it is possible to combine the opposing requirements into one sucessfull combination and to produce a satisfactory compromise solution.

Referring now to the drawing in detail, the pneumatic tire shown therein comprises a carcass 1, two fabric plies 4, 5 anchored on the cores 2 in the tire beads 3, and a tread strip 6 centrally arranged upon the carcass 1. An additional fabric reinforcement represented by the belt 7 passes between the tread strip 6 and the carcass 1 and corresponds in width to the tread strip 6. The nearly flat cylindrical or only slightly curved carcass extends over the outer surface of the wheel rim 8 between the seating surfaces for the tire beads 3 and forms outwardly convex arcs of curvature in its side portions. The arcs of curvature end or run into the tire beads 3 with a reversal of their direction of nearly 180°. The characteristic measurements of the tire cross section are so coordinated that the height H equals about one third of the width B, and the width b of the tread strip 6 does not exceed ⅔ of the tire width B.

The maximum thickness of the carcass 1 in the area of the tire bead 3 considerably exceeds the normal size and then uniformly decreases over the entire course of the adjacent arc of curvature up to the rim areas or edges of the tread strip 6. Analogously, the fabric plies 4, 5 are embedded at a constant distance from the outer walls in such a way that they enclose a somewhat wedge-shaped space which narrows in the direction toward the tread strip 6. The intermediate space is filled with a homogeneous intermediate layer 9 made of a relatively hard grade rubber. Thus the fabric plies 4, 5 can maintain their statically fixed condition relativa to each other under all circumstances, even during elastic deformations. This is particularly true in the deflated state of the tire, in which case the intermediate layers 9 directly act as supporting cushions, establishing the emergency running features of the pneumatic tire of the present invention.

The above described construction of the carcass 1 in connection with the particular coordination of the essential measurements results in the deflections, which occur during normal dring operation, taking place exclusively in the area designated by the circle 10.

It is, of course, to be understood that the present invention is by no means limited to the specific showing in the drawing but also comprises any modifications within the scope of the appended claims.

What we claim is:

1. A flattened pneumatic vehicle tire for placement upon a wheel rim with rim flanges comprising a carcass having a width sufficient to permit said carcass to freely span the wheel rim upon which the tire is to be placed, said carcass having tapered side walls which deform for emergency running characteristics in case of partial or complete pressure loss and tire beads with pull-resistant core rings for seating said tire on a wheel rim adjacent the rim flanges thereof, said side walls extending outwardly from said beads to overlie the rim flanges and then curving radially outwardly and axially inwardly to the transverse tread portion of said carcass, said tread portion being circumferentially inextensible and substantially cylindrical between said side walls, a tread strip centrally and circumferentially arranged upon said tread portion, said tread strip being arranged upon said carcass with sharply defined edges and having a width equalling up to two-thirds of the total width of said tire as measured between the outer edges of the arc of curvature of said curved marginal areas of said side walls, the height of the cross section of said tire at a maximum equalling one-third the width of said tire, said carcass having a thickness continuously decreasing from its maximum thickness in the region of said tire beads to a minimum thickness which is a fraction of said maximum thickness and located at a transition area at the edges of said tread strip, and having two fabric plies imbedded in said carcass and respectively looped around said core rings and extending across said tread portion beneath said tread strip, the distance between said plies decreasing from the area of said beads in the direction toward said tread strip; and an elastically deformable incompressible intermediate layer between said fabric plies, said intermediate layer being wedge-shaped and comprised of homogeneous elastomeric material and enclosed by said plies in the curved marginal areas of said side walls and surrounding said core rings and decreasing in thickness from said side walls adjacent said core rings to said transition area which is an essentially thinner deflection and lighter deformable area of minimum thickness between each side wall and said tread strip to provide maximum deflection adjacent said tread strip as a compromise influence in traveling comfort during the pressure inflated operation, while the elastomeric material in said side walls provides a cushion overlying said rim flanges.

2. A tire as claimed in claim 1, in which said homogeneous elastomeric material includes fibers mixed therein.

3. A tire as claimed in claim 1, in which the sides of said tread strip and said core rings are approximately in the same radial planes.

* * * * *